(No Model.)

A. B. PERINE.
AIR COMPRESSOR.

No. 580,714. Patented Apr. 13, 1897.

WITNESSES

INVENTOR
A. B. Perine
by Bakewell & Bakewell
his attys.

UNITED STATES PATENT OFFICE.

AARON B. PERINE, OF TOPEKA, KANSAS.

AIR-COMPRESSOR.

SPECIFICATION forming part of Letters Patent No. 580,714, dated April 13, 1897.

Application filed April 18, 1896. Serial No. 588,088. (No model.)

*To all whom it may concern:*

Be it known that I, AARON B. PERINE, of Topeka, in the county of Shawnee and State of Kansas, have invented a new and useful Improvement in Air-Compressors, of which the following is a full, clear, and exact description, reference being had to the accompanying drawings, forming part of this specification, in which—

Figure 1:
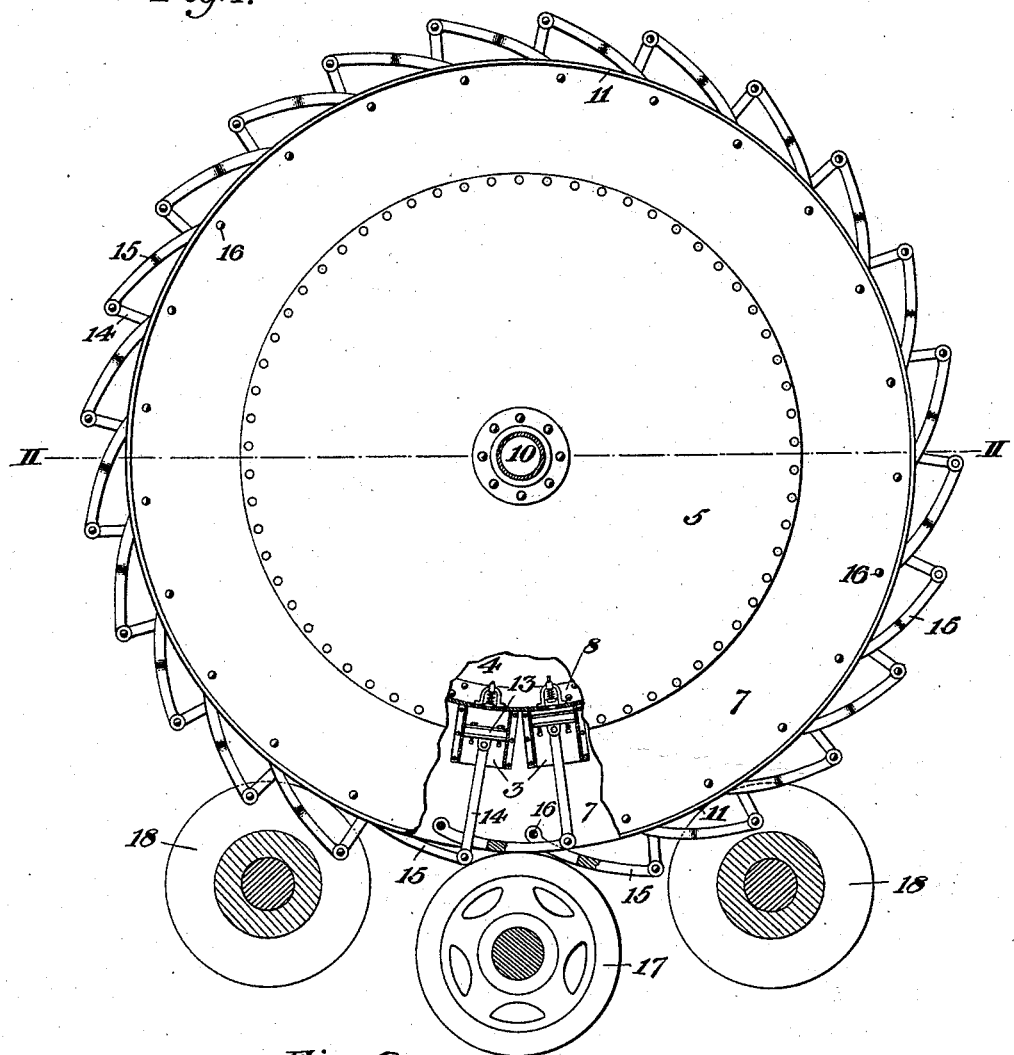
Figure 2:
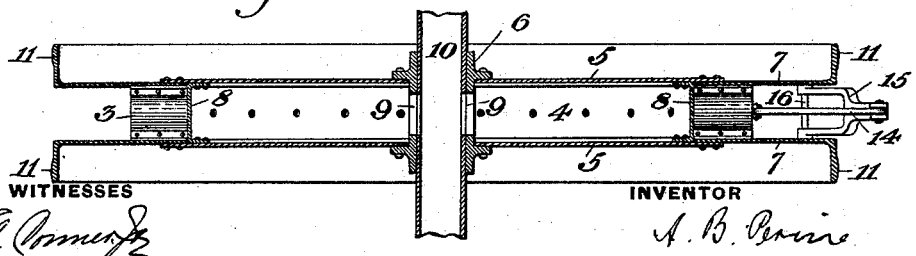

Figure 1 is a side elevation, partly broken away, of my improved air-compressor; and Fig. 2 is a transverse section on the line II II of Fig. 1.

My invention relates to the class of air pumps or compressors and is designed to provide an improved apparatus of such character which shall provide means for increasing the power applied as the pressure increases in the pump-cylinder and shall prevent heating up of the cylinder and valves.

In the drawings, in which similar numerals indicate corresponding parts, 2 indicates a large wheel within which are carried a circular series of air-compressing cylinders 3. The wheel is provided with a central circular reservoir 4, the sides of which are formed by plates 5, secured to the inner hub 6 and to the annular rim portions 7. Between the plates 5 is riveted the annular band 8, having inwardly-extending flanges through which the securing-rivets pass. Through the hub forming the inner end of this reservoir are holes 9, through which the compressed air passes into the hollow shaft 10, from which the air is led to the point desired. The rim portions 7 have an outer flange 11, around which pass suitable belts for driving the wheel.

The cylinders 3 are secured to the band 8 at their inner ends, and at their sides they are secured to the rim portions by interposed flanged strips 12, secured to the rim and to projections cast upon the cylinders. The piston 13 of each cylinder is connected by a link 14 to a lever-arm 15, pivoted to the rim at 16, these levers being suitably forked to allow the next lever and link to work within the slot of the fork, as shown. The entire weight of the wheel 2 rests upon a wheel 17, which is carried in suitable bearings and contacts with the inner portions of the flanges 11 inside the belt-receiving portions thereof. The pistons 13 are provided with suitable inwardly-opening valves, the stems of which are provided with suitable springs to hold them normally to their seats, and in the inner ends of the cylinders, formed by portions of the band 8, are inwardly-opening valves, similarly held to their seats by coiled springs.

To hold the wheel 2 steady and guide it in its rotating movement, I employ wheels 18 on either side of the wheel 17, these side wheels having flanges bearing on the rim, but being slotted deeply, so as to receive the lever-arms of the pistons.

The operation of the device is apparent. The wheel 2 being rotated by the belts, as the levers approach the lower portion of their path they contact with the rim of the wheel 17, and are thus gradually moved, pushing in the pistons of the cylinders. As the wheel 17 is of comparatively small diameter, the work is done by one cylinder at a time, and as the link 14 approaches the line between the centers of the wheels, when the piston nears the end of its stroke, a toggle action takes place, thus giving the greatest power at the time of greatest pressure. As the levers pass the wheel 17 gravity acts to throw out the pistons, where they remain until the levers again contact with the wheel 17.

The advantages of my invention result from the fact that each cylinder is given time to cool after each stroke, while the pressure is maintained comparatively uniform, and the greatest power is applied at the proper time to the pistons of the cylinders.

Many variations may be made by the skilled mechanic in the form and arrangement of the parts without departure from my invention, since

What I claim is—

1. An air-compressor comprising a wheel having actuating connections for driving the same, a circular series of air-compressing cylinders secured to said wheel, projecting levers fulcrumed to the wheel and connected to the pistons or plungers of said cylinders, and a wheel having a rim portion arranged to contact with said levers and actuate the plungers.

2. An air-compressor comprising a wheel having a rim provided with belt-carrying portions, said wheel having a circular series of air-compressing cylinders, and a wheel upon which said first wheel rests, and arranged to actuate the pistons or plungers of the cylinders as the upper wheel is rotated; substantially as described.

In testimony whereof I have hereunto set my hand.

AARON B. PERINE.

Witnesses:
A. A. MAJORS,
SHERMAN B. PERINE.